United States Patent [19]
Dees, Jr. et al.

[11] Patent Number: 5,836,227
[45] Date of Patent: Nov. 17, 1998

[54] WEED CUTTER HEAD

[76] Inventors: John M. Dees, Jr., 7153 Hanson Dr. N., Jacksonville, Fla. 32210; Earl O. Highsmith, Rte. 24, Box 459, Baldwin, Fla. 32234

[21] Appl. No.: 766,507

[22] Filed: Dec. 13, 1996

Related U.S. Application Data

[63] Continuation-in-part of Ser. No. 414,091, Mar. 31, 1995, abandoned.

[51] Int. Cl.$^6$ ................................................. B26B 27/00
[52] U.S. Cl. ............................................. 30/276; 30/347
[58] Field of Search ......................... 30/276, 347, 272.1, 30/263; 56/12.7, 295

[56] References Cited

U.S. PATENT DOCUMENTS

| | | | |
|---|---|---|---|
| 4,097,991 | 7/1978 | Proulx | 30/276 |
| 4,145,809 | 3/1979 | Proulx | 30/276 |
| 4,162,575 | 7/1979 | Ballas | 30/347 |
| 4,290,200 | 9/1981 | Lombard | 30/276 |
| 4,571,831 | 2/1986 | White, III | 30/276 |
| 4,644,655 | 2/1987 | Bottamiller et al. | 30/347 |
| 4,685,279 | 8/1987 | Gullett | 30/276 X |
| 4,790,071 | 12/1988 | Helmig et al. | 30/276 |
| 4,928,457 | 5/1990 | Laperle | 30/276 X |
| 5,020,224 | 6/1991 | Haupt | 30/276 |
| 5,048,278 | 9/1991 | Jones et al. | 30/276 X |
| 5,398,416 | 3/1995 | Mackey | 30/347 |
| 5,430,943 | 7/1995 | Lee | 30/347 |

*Primary Examiner*—Maurina T. Rachuba
*Attorney, Agent, or Firm*—Arthur G. Yeager; Earl L. Tyner

[57] ABSTRACT

A head suitable for use on any weed cutter, regardless of whether it has a left-hand or right-hand threaded shaft. The head includes, in order from top to bottom, an arbor enclosing an elongated hexagonal nut with internal threads to engage the shaft of a weed cutter, a line holding plate, two cutting lines, a tension plate, a tightening knob and a bolt held by the knob and threaded into the hexagonal nut.

8 Claims, 6 Drawing Sheets

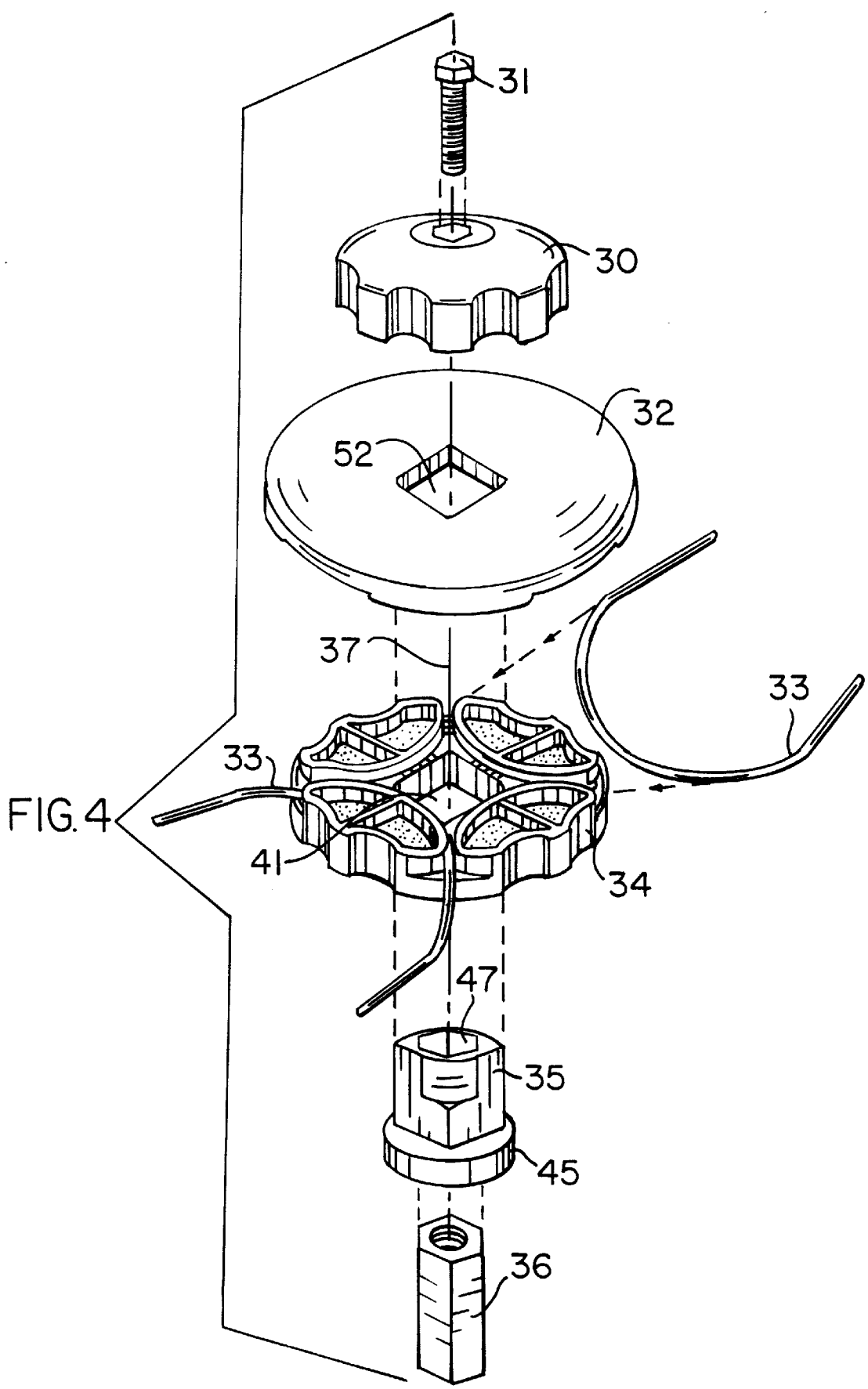

WEED CUTTER HEAD

CROSS-REFERENCE TO RELATED APPLICATION

This application is a continuation-in-part of U.S. patent application Ser. No. 08/414,091, filed on Mar. 31, 1995, now abandoned.

TECHNICAL FIELD

This invention relates to the technical field of hand-held weed cutting machines using flexible filament cutters.

BACKGROUND OF THE INVENTION

For many years there have been available portable weed cutters for use by homeowners, farmers, gardeners, and those whose business is the upkeep of lawns. These weed cutters comprise a whirling head on the lower end of an elongated frame that can be swung around with the head close to the ground. The head usually includes one or more lengths of a flexible monofilament (usually nylon) which serves as a blade to cut grass and weeds but is not dangerous to feet or hands. The head is usually attached to the weed cutting handle by way of a threaded shaft, which is turned at a high speed by a small gasoline engine or by a small electric motor. The cutting monofilament breaks or wears out from time to time and must be replaced. In some machines a spool of monofilament is incorporated in the whirling head and is wound on the spool in such a way that the monofilament is dispensed slowly. In other machines, the head employs one or more short lengths of monofilament which must be replaced by attaching replacement lengths when the previous ones break. The present invention is of the latter type, usually employing two short lengths of monofilament at a time so as to provide four flexible ends to function as cutters.

The entire head of modern day weed cutters is frequently damaged by impact with stones, concrete, metal objects and the like. The present invention is intended to be a universal replacement head for most weed cutters.

It is an object of this invention to provide a novel weed cutter head. It is another object of this invention to provide a weed cutter that is lighter, less costly, and more universally adaptable than the weed cutter heads available on the market today. Still other objects will become apparent from the more detailed description which follows.

BRIEF SUMMARY OF THE INVENTION

This invention relates to a weed cutting head which is a combination of a knob bolt, a knob, a tension plate, a flexible monofilament cutting line, line holder plate, an arbor, and an internally threaded elongated hexagonal nut. The knob is a thick circular disc having a central axial bore with a hexagonal counterbore adapted to operationally engage a hexagonal head on the knob bolt. The tension plate is a thin circular disc with a lower smooth planar face and an upper face with a plurality of raised serrated radial ridges and a plurality of raised perimetric serrated ridges round a central square axial passageway. The line holding plate is a thick circular disc having a sooth planar upper face and an irregular lower face including a plurality of se rated radial channels and a plurality of serrated perimetric channels around a central square axial passageway the ridges of the tension plate and the channels of the line holding plate being adapted to mate with each other in a loose male-female coupling with the monofilament cutting line clamped between the se rations and the free ends of the line extending outwardly from the head. The arbor is a central pin with a square body to fit snugly into the square passageways of the tension plate and of the line holding plate; a central axial hexagonal bore in the arbor is adapted to receive the elongated hexagonal nut therein; and a upper flange on the arbor is adapted to receive the elongated hexagonal nut therein and to lie against the upper smooth planar face of the line holding plate. One or two monofilament cutting lines may be threaded into and clamped between the serrations in the channels of the line holding plate and the serrations on the male ridges of the tension plate, and held tightly in place when the knob bolt being tightened into the hexagonal nut. Furthermore the tightening action is entirely in the axial direction, without any tangential movement between tension plate 32 and line holding plate 34 that might tend to fray line 33, such as that found in prior art devices.

In a specific embodiment of the invention the knob, the tension plate, the line holding plate, and the arbor are molded plastic articles, while the bolt and nut are metallic articles, preferably steel or brass. In another specific embodiment there are four radial ridges and channels and two perimetric ridges and channels on the tension plate and the line holding plate, respectively. Normally it is preferred to employ two lengths of monofilament cutting lines on the head when in use. In still another embodiment a retrofit kit is provided that includes one knob, one tension plate, one line holding plate, one arbor, two knob bolts and two hexagonal nuts. The two bolts and nuts being one of each with left-hand threads and one of each with right-hand threads.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 4 is an exploded view in perspective of the head of this invention;

DETAILED DESCRIPTION OF THE INVENTION

The invention is best understood by reference to the attached drawings with component members referenced by numbers.

Figure 1:
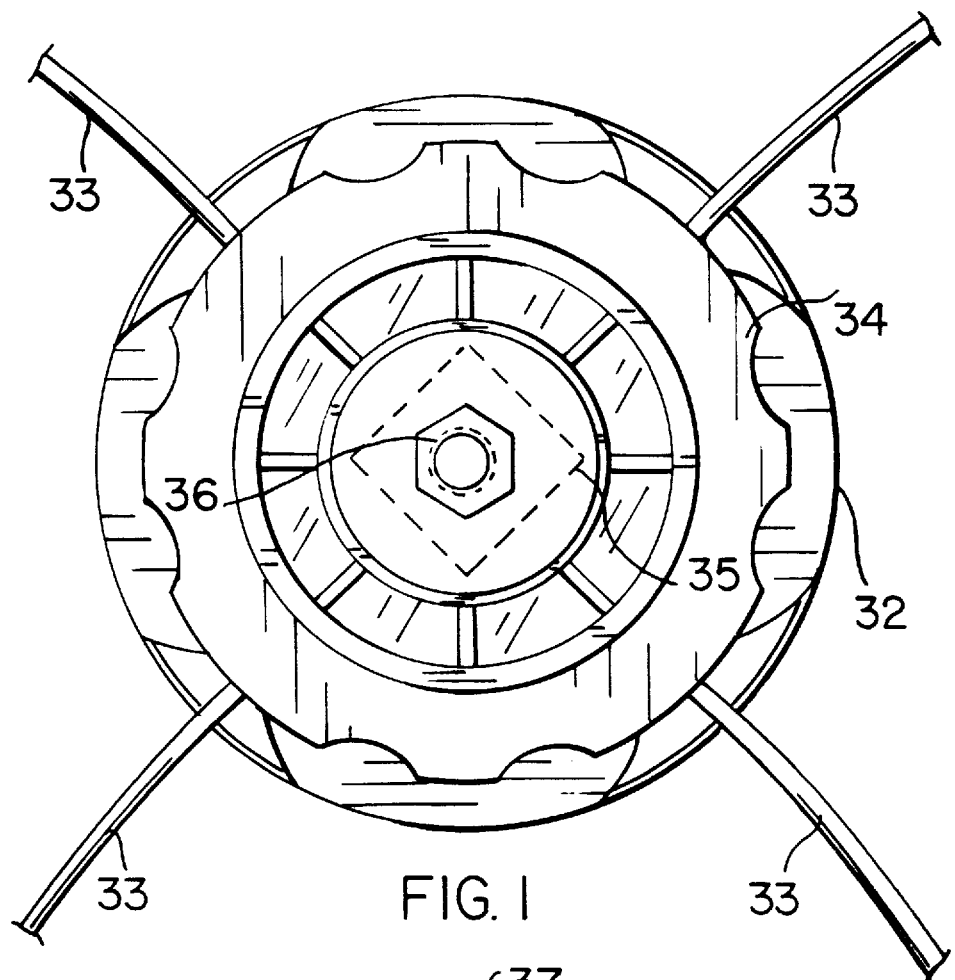
FIG. 1 is a top plan view of the assembled head of this invention.

FIG. 1 shows the combined head of this invention in the position it would take at the bottom of a weed cutting handle. The words "up", "upper", and the like refer to the direction toward the operator of the weed cutter, and the words "down", "lower" and the like refer to the direction close to the ground and grass that is cut by this invention. Thus knob 30 is generally touching the ground and the grass while flange 35 is adjacent the motor and handle held by the operator of the machine. In substantially all weed cutters there is an externally threaded shaft or stud or rod at the lower end of the handle held by the operator, and this shaft or stud or rod is turned rapidly by a motor (gasoline or electric) mounted on that handle. It is to this shaft, stud, or rod that the present invention is attached by means of the internal threads of the hexagonal nut 36 mounted flush with the upper surface of flange 45 of arbor 35.

Arbor 35 functions as a central pin upon which line holding plate 34 is next positioned with the square hole in plate 34 fitting snugly around the square body 46 of arbor 35. Next in order is tension plate 32 which also has a square central hole 52 to fit snugly around arbor body 46. Lastly knob 30 with knob bolt 31 projecting axially upward therefrom is attached by means of the outer threads of bolt 31 engaging the inner threads of hexagonal nut 36. Cutting lines 33, extend through the head, clamped between line holding plate 34 and tension plate 32 as will be described below. When this combination head is tightened onto the shaft, stud, or rod of the weed cutting motor, the entire head as shown in FIGS. 1–3 whirls rapidly around axis 37 causing flexible cutting lines to cut grass or weeds easily.

Figure 2:
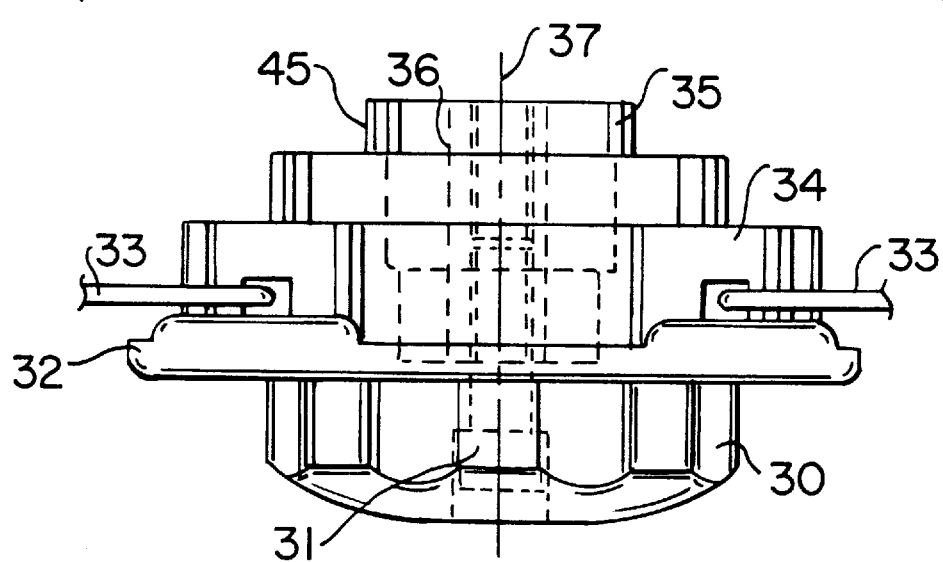
FIG. 2 is a front elevational view of the assembled head of this invention.
Figure 3:
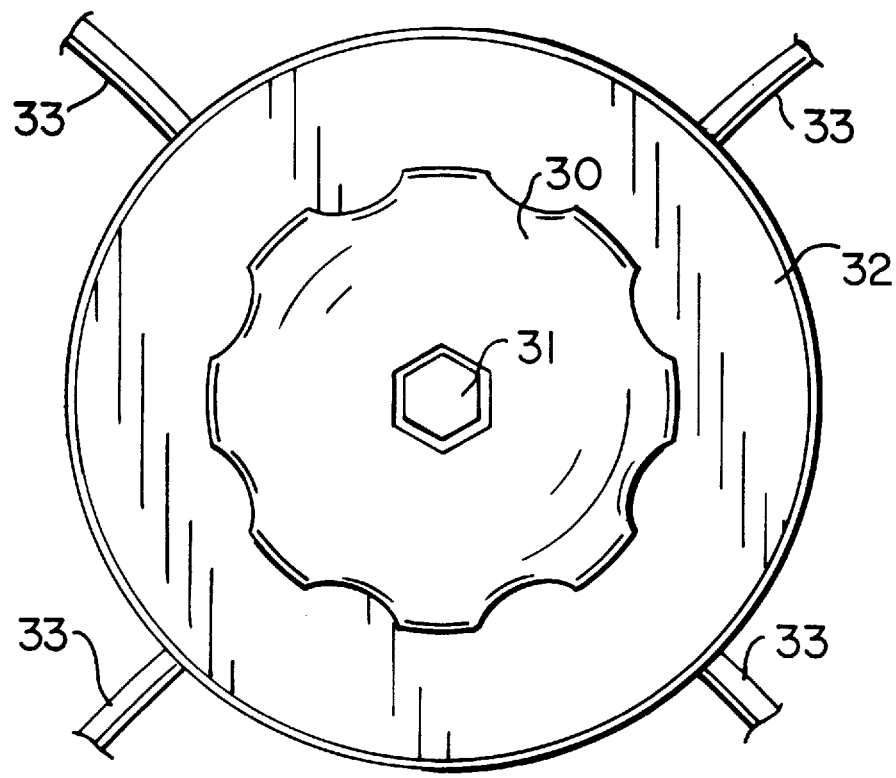
FIG. 3 is a bottom plan view of the assembled head of this invention.

In FIG. 4 the head of FIGS. 1–3 is shown in perspective and in an exploded view. This view is upside down for purposes of showing some of the features. Hexagonal nut 36 is actually tightened onto the shaft, stud, or rod of the cutter motor; and knob 30, in operation is at the lower portion of the entire head, next to the grass being cut. Elongated hexagonal nut 36 slides tightly into a similar hexagonal bore 47 in adapter 35. Adapter 35 has a square body 46 which slides into central square hole 41 in line holding plate 34 and on into central square hole 52 of tension plate 32. Two cutting lines 33 fit into ridged channels in line holding plate 34, and are clamped tightly therein by similar ridges on the face (not seen in FIG. 4) of tension plate 32. Knob 30 carries with it knob bolt 31 which extends along the axis 37 of the head to be engaged with the upper end (as viewed in FIG. 4) of hexagonal bolt 36. By tightening knob 30 by hand the entire head is tightened against the motor shaft of the weed cutter, clamping cutting lines 33 in the channels mentioned above. The thickness of knob 30 serves as a gauge for the height of the cut grass; a thinner knob producing shorter grass and a thicker knob producing longer grass.

Figure 5:
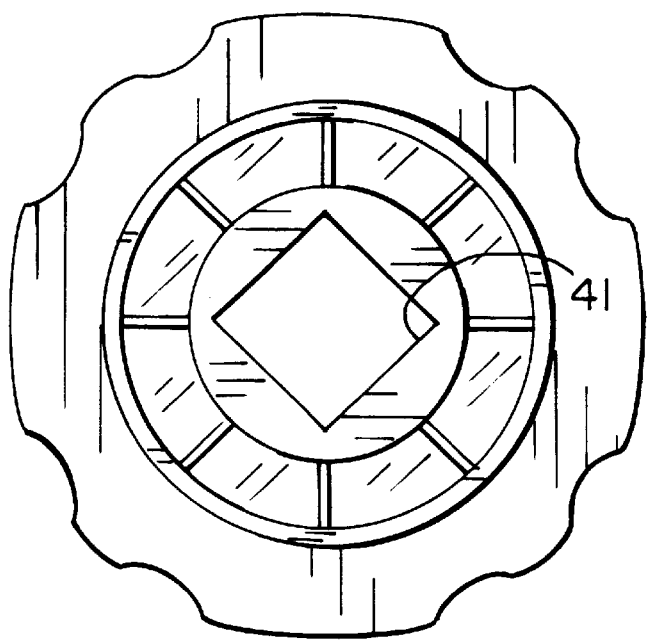
FIG. 5 is a top plan view of the line holding plate of this invention.
Figure 6:
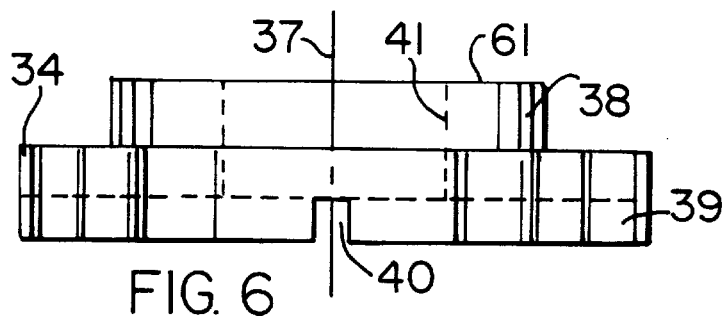
FIG. 6 is a front elevational view of the line holding plate of this invention.
Figure 7:
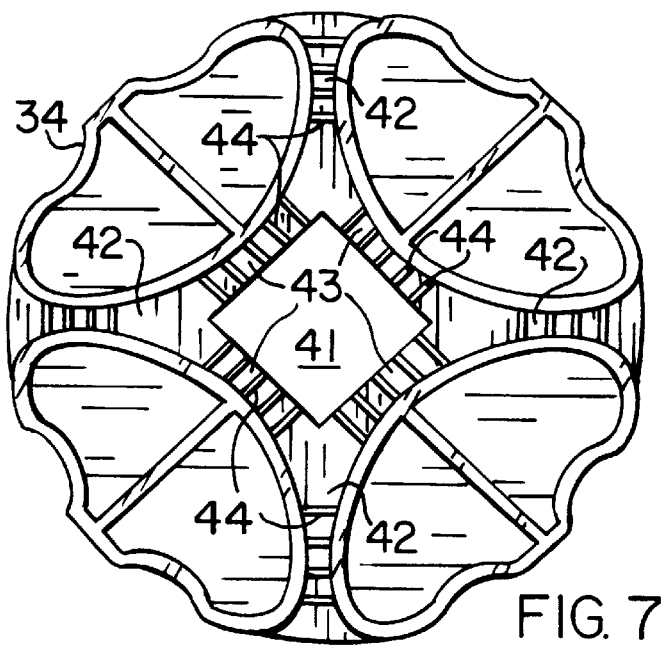
FIG. 7 is a bottom plan view of the line holding plate of this invention.

FIGS. 5–7 show the features of the line holding plate 34 of FIGS. 1–4. In operational position FIG. 5 shows the upper face (closer to the motor) and FIG. 7 shows the lower face (closer to the grass). The upper surface 61 of plate 34 forms a seat for flange 45 of arbor 35 (see FIGS. 1–4). Around central axis 37 is a central square hole 41 forming a passageway through the entire plate 34. The upper section 38 of plate 34 is a cylindrical portion that could be solid, but for purposes of less weight and less cost is formed into an outer ring and a plurality of reinforcing radial spokes. Other designs could be employed so long as there is room for central square hole 41 and a seat for flange 45 of arbor 35. The lower section 39 of plate 34 is a plurality of thin walls to form channels 42 and 43 in which cutting lines 33 are clamped. A plurality of radial channels 42 (four shown here) and a plurality of perimetric channels 43 around the perimeter of central square hole 41 form four different guideways through which cutting lines may be threaded. To assist in the clamping action there are a plurality of spaced, raised teeth or ridges 44 perpendicular to each channel 42 and 43. These form a serrated appearance to the channels 42 and 43. A combination of any two adjacent radial channels 42 and a single adjoining perimeter channel 43 forms a guideway for one length of cutting line entering or exiting through a doorway 40 to a guideway. Line 33 preferably is a nylon monofilament 100–150 mils (about ⅛ inch) in diameter. Preferably line holding plate 34 is made of molded plastic, e.g., polyolefin, polyacetal, polyamide, polycarbonate or the like.

Figure 8:
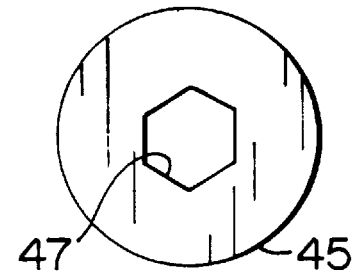
FIG. 8 is a top plan view of the arbor of this invention.
Figure 9:
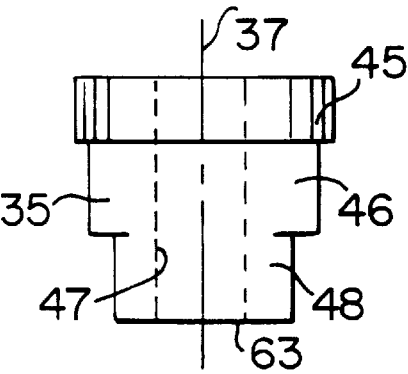
FIG. 9 is a front plan view of the arbor of this invention.
Figure 10:
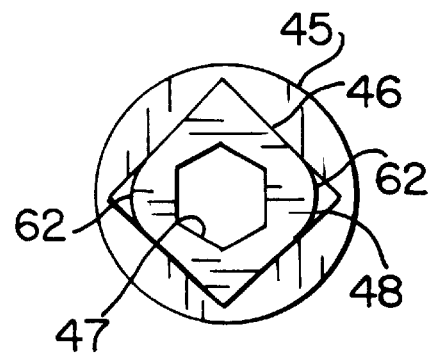
FIG. 10 is a bottom plan view of the arbor of this invention.

FIGS. 8–10 show arbor 35 (see FIGS. 1–4) that serves as a central pin to join all the component parts of the head of this invention. The views of FIGS. 8–10 are such that the orientation of FIG. 9 is exactly the same as it actually occurs when the head of this invention is in actual use cutting weeds or grass. Flange 45 is at the upper end of the head (i.e. closer to the operator) and arbor head 48 is at the lower end of the head (i.e., closer to the grass). Arbor 35 is a connecting pin that joins all parts (plates 32 and 34 and knob 30) into a single unit. Arbor 35 has a cylindrical flange 45 at its upper end and a central hexagonal bore 47 extending completely through the arbor. The main body 46 is a square plug and the head 48 is a pointed elliptical shape, the result of rounding two opposite corners 62 of the square body 46. The axial length of head 48 is sufficiently long to extend below the contiguous surfaces of tension plate 32 and line holding plate 34. This is an important feature in that it permits feeding line 33 into appropriate channels 42 when changing a line without completely disassembling the entire head. The axial length of arbor 35 is substantially the same as the axial length of hexagonal nut 36.

Figure 13:
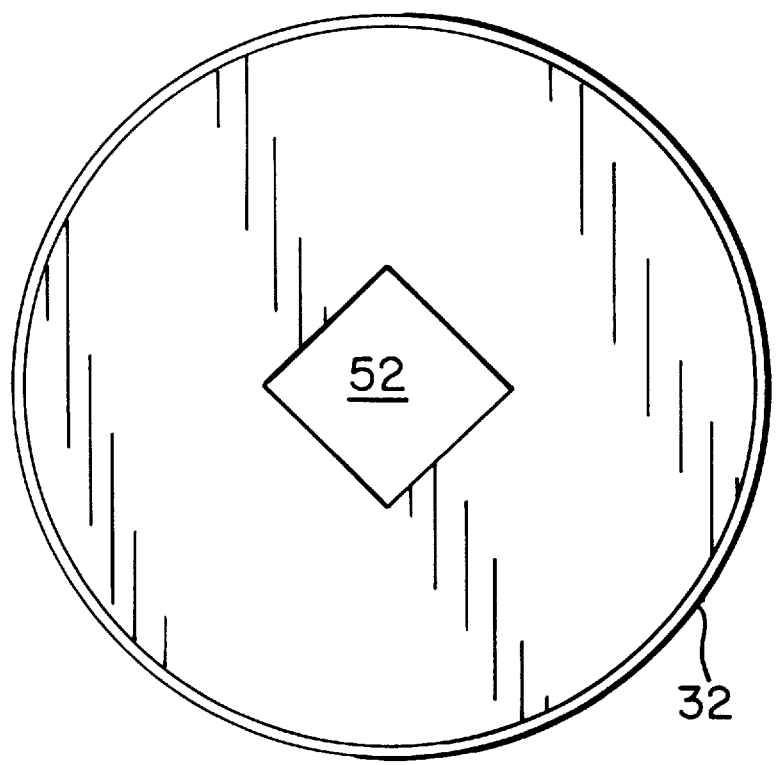
FIG. 13 is a bottom plan view of the tension plate of this invention.
Figure 11:
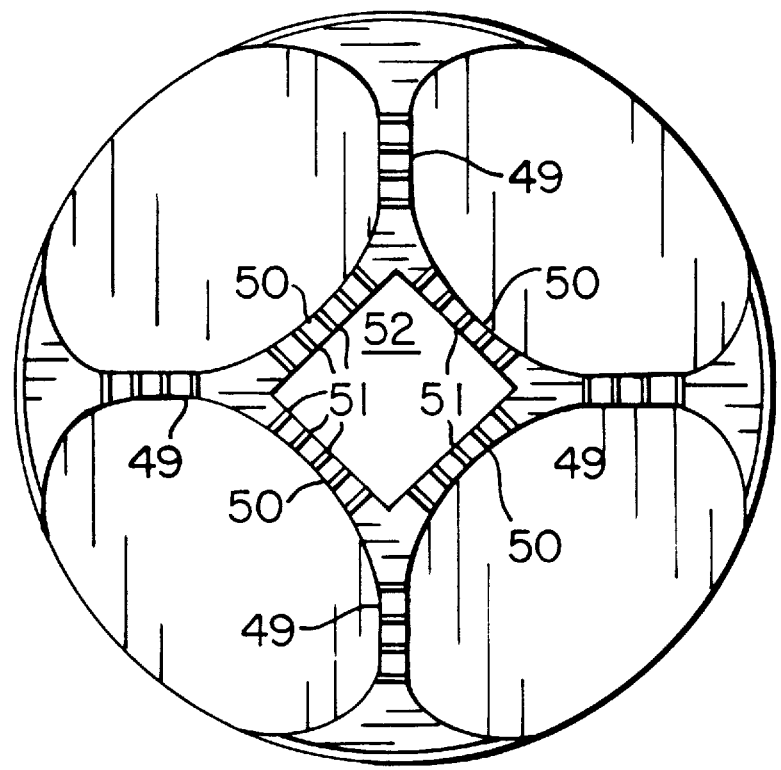
FIG. 11 is a top plan view of the tension plate of this invention.
Figure 12:
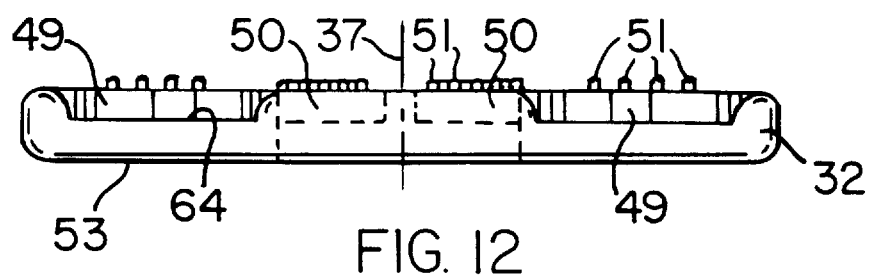
FIG. 12 is a front elevational view of the tension plate of this invention.

In FIGS. 11–13 there is shown tension plate 32 (see FIGS. 1–4) in the same orientation as it is found in actual use. The upper face of the plate as shown in FIG. 11 is closer to the operator and the lower face 53 as shown in FIG. 13 is closer to the grass. This plate 32 serves as the second clamping member (working against line holding plate 34 as the first clamping member) to hold cutting lines 33 tightly in place. Plate 32 has a central axial square hole 52 identical to that (41) of plate 34 (see FIGS. 5–7) to accommodate arbor 35. The lower face 53 of plate 32 is a smooth planar surface forming a seat against which knob 30 is tightened. A central surface 64 is parallel to and slightly higher, e.g., about 0.125 inch, than bottom surface 53. Raised above central surface 64 are a plurality of radial ridges 49 and perimetric ridges 50 which cooperate with the corresponding channels 42 and 43 of line holding plate 34 (see FIGS. 5–7). Perimetric ridges 50 are aligned with perimetric channels 43 and radial ridges 49 are aligned with radial channels 42 of FIGS. 5–7. Perpendicular across each ridge 49 and 50 are a plurality of spaced raised teeth or ridges 51 to produce a serrated appearance. Such serrations enhance the clamping effect needed to hold cutting lines 33 in place. The clamping forces on line 33 are solely directed parallel to axis 37, with ridges 49 and 50 being thin enough not to touch the side walls of channels 42 and 43 and, therefore, do not take part in the clamping of line 33.

Figure 14:
FIG. 14 is a top plan view of the hexagonal nut of this invention.
Figure 15:
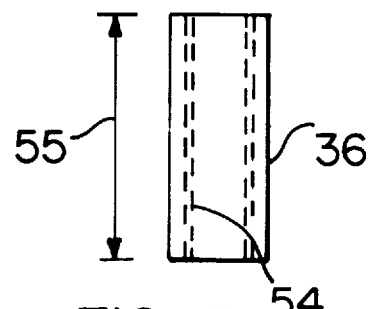
FIG. 15 is a front elevational view of the hexagonal nut of this invention.

FIGS. 14–15 show the elongated hexagonal nut 36 with internal threads 54. This nut is the central axial core of the head of this invention. At its upper end nut 36 is screwed onto the shaft, stud, or rod of the motor of the weed cutter. At its lower end nut 36 is threaded onto knob bolt 31, which is tightened by knob 30 to clamp the entire head and the cutting lines into one unit. The outer hexagonal shape must closely fit into the hexagonal bore 47 in arbor 35, and the central threads must match the threads on the shaft, stud, or rod of the motor as well as the threads of knob bolt 31. When the combination head of this invention is marketed as a retrofit kit, two or more of these hexagonal nuts 36 are included; so as to fit the size and direction of twist of the shaft or stud of the weed cutter motor. The reason for this duplication is that weed cutter motors are made with their shaft, stud, or rod having threads of either type, depending on the rotation direction of the motor. Hence, for the kit to be universally adaptable, different types of hexagonal nuts are provided, and correspondingly different types of bolts 31 are included allowing the consumer to use whatever combination is suitable. The overall axial length 55 of nut 36 is at least one half of the overall axial length of the combined head, so that the remaining length can be taken up by knob bolt 31. Generally the axial length of hexagonal nut 36 will be the same as the axial length of arbor 35, which preferably is about 1.25 inches. The size of threads internally of hexagonal nut 36 is governed by the size of shaft, stud, or rod of the weed cutter motor, and that is standardized at 0.375 inch. The hexagonal shape of nut 36 and bore 47 in arbor 35 is not critical; the shape could be square or other polygonal shape which will not turn independently of arbor 35.

Figure 16:
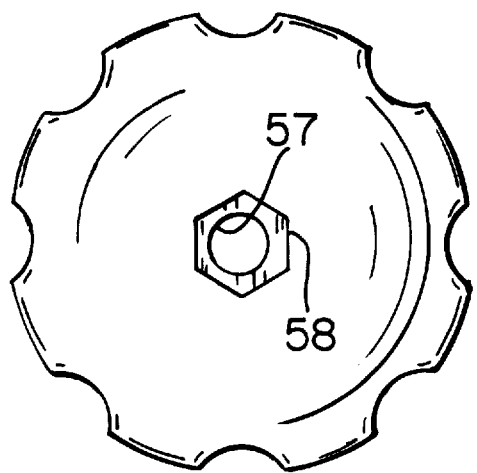
FIG. 16 is a top plan view of the knob of this invention.
Figure 17:
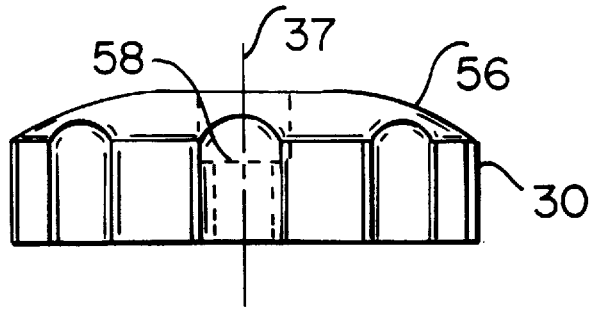
FIG. 17 is a front elevational view of the knob of this invention.
Figure 18:
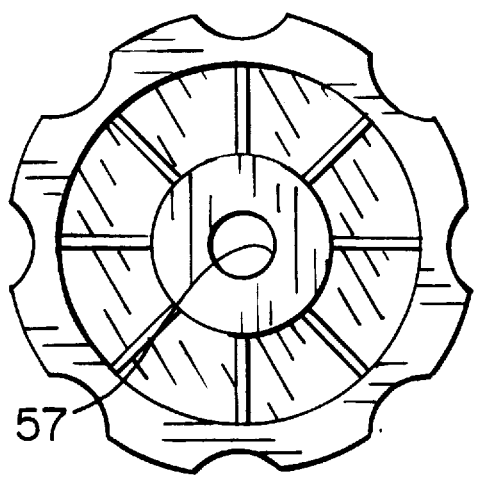
FIG. 18 is a bottom plan view of the knob of this invention.

FIGS. 16–18 show knob 30 to be a simple fluted cylinder with a convex lower face 56 appropriate for manual gripping, since its principal function is to assist in turning knob bolt 31. There is a hexagonal counterbore 58 to receive the head 59 of knob bolt 31, and a central circular bore 57 to permit the shaft 60 of knob bolt 31 to extend upward through knob 30. Knob 30 is shown with a hollow interior reinforced with radial ribs. This design is, of course, employed to save weight and cost. Solid designs or other partially hollow designs would be equally operable.

Figure 19:
FIG. 19 is a top plan view of the knob bolt of this invention.
Figure 20:
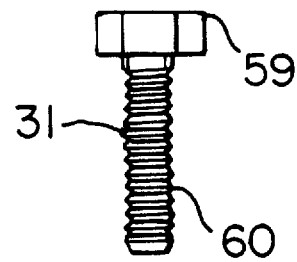
FIG. 20 is a front elevational view of the knob bolt of this invention.

FIGS. 19–20 show knob bolt 31 to have a hexagonal head and a threaded shank, as would a standard bolt on the market today.

An alternative arrangement to the combination of parts described herein is to employ a single molded object combining the features of line holding plate 34 with arbor 35 into one molded article.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A weed cutting head attachable to a portable weed cutting machine wherein said head comprises the combination of the following components in the order given from a lower ground level to an upper attachment to said machine: a knob bolt, a knob, a tension plate, at least one length of a flexible monofilament cutting line, a line holding plate, an arbor, an internally threaded elongated hexagonal nut, and at least one length of a flexible monofilament cutting line; said knob being a thick circular disc having a central bore with a hexagonal counterbore adapted to seat a hexagonal head on said knob bolt; said tension plate being a thin circular disc having a lower smooth planar face, an upper ridged face, and a central axial first square passageway, said upper face containing a plurality of raised radial serrated narrow ridges and a plurality of raised perimetric serrated narrow ridges around said first square passageway; said line holding plate being a thick circular disc having a planar upper surface, a channeled lower surface, and a central axial second square passageway said lower surface having a plurality of radial serrated narrow channels and a plurality of perimetric serrated narrow channels around said second square passageway, said channels and said ridges being aligned and fitting together in a male-female coupling; with said cutting line clamped therebetween and with the free ends thereof extending outwardly of said line holding plate; said arbor being a central axial pin having a square body fitting snugly into said first and second square passageways, having a central hexagonal axial bore functioning as a snugly fitting seat for said hexagonal nut, and having a laterally extending flange at the upper end of said arbor; said hexagonal nut being totally enclosed in said hexagonal bore.

2. The head of claim 1 wherein said tension plate has four equally spaced radial ridges, said line holding plate has four equally spaced radial channels, and said head includes another cutting line, said at least one and another cutting lines having a total of four free ends extending diametrically outwardly from said head.

3. The head of claim 2 wherein each said cutting line has its central portion clamped between said tension plate and said line holding plate, and two tail ends extending radially outwardly of said head.

4. The head of claim 3 wherein each said line lies along two opposite said serrated radial channels and two adjacent said perimetric channels positioned around the edge of said square hole and joining said two opposite said serrated radial channels.

5. The head of claim 1 wherein said knob, said tension plate, said line holding plate, and said arbor are molded plastic articles, and said knob bolt and said hexagonal nut are metallic articles.

6. The head of claim 1 wherein one end of said hexagonal nut is flush with the top surface of said flange of said arbor and the other end of said hexagonal nut is threaded onto said knob bolt.

7. The head of claim 1 wherein said flexible cutting line is a strand of nylon monofilament.

8. The head of claim 1 in a retrofit kit including two internally threaded hexagonal nuts, one of said nuts having right-hand threads and the other of said nuts having left-hand threads.

\* \* \* \* \*